United States Patent
Dinh et al.

(10) Patent No.: US 6,889,943 B2
(45) Date of Patent: May 10, 2005

(54) HANGER BAR ASSEMBLY (75) Inventors: Cong Thanh Dinh, Memphis, TN (US); Harsh Gupta, Memphis, TN (US); Mark R. Drane, Germantown, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 115 days.

(21) Appl. No.: 09/899,862

(22) Filed: Jul. 6, 2001

(65) Prior Publication Data

US 2003/0006353 A1 Jan. 9, 2003

(51) Int. Cl.[7] ................................................ B42F 13/00
(52) U.S. Cl. ............................ 248/34; 248/57; 248/906
(58) Field of Search ............................ 248/343, 205.1, 248/906, 200.1, 909, 57, 546; 220/3.2, 3.9, 3.3, 3.7; 403/363, 359.1, 377, 379.6; 211/105.3, 105.1, 123, 204

(56) References Cited

U.S. PATENT DOCUMENTS

| | | | |
|---|---|---|---|
| 1,211,182 A | 1/1917 | Kruse | |
| 1,568,279 A | 1/1926 | Herskovitz | |
| 1,850,616 A | 3/1932 | Barnett | |
| 2,023,083 A | 12/1935 | Knell | |
| 2,140,861 A | 12/1938 | Steketee | |
| 2,528,418 A | 10/1950 | Buckels | |
| 2,670,919 A | 3/1954 | Esoldi | |
| 2,713,983 A | 7/1955 | Kay | |
| 2,770,436 A | 11/1956 | Linhardt, Jr. | |
| 2,809,002 A | 10/1957 | Rudolph | |
| 2,865,585 A | 12/1958 | Beyer et al. | |
| 2,925,236 A | 2/1960 | Cook et al. | |
| 2,930,564 A | 3/1960 | Maier | |
| 2,945,661 A | 7/1960 | Appleton | |
| 2,963,253 A | 12/1960 | Maier et al. | |
| 2,964,279 A | 12/1960 | Galloway | |
| 3,053,494 A | 9/1962 | Stoll | |
| 3,163,386 A | * 12/1964 | Collins | 248/71 |
| 3,214,126 A | * 10/1965 | Roos | 248/318 |
| 3,425,655 A | * 2/1969 | Cogdill | 248/343 |
| 3,518,421 A | * 6/1970 | Cogdill | 240/85 |
| 3,597,889 A | 8/1971 | Lo Nigro | |
| 4,050,603 A | 9/1977 | Harris et al. | |
| 4,391,428 A | 7/1983 | Grimes | |

(Continued)

OTHER PUBLICATIONS

Super Fan Brace, Instructions for Assembly–Installation, Reiker Enterprises, Inc., Anniston, Alabama.
Super Fan Brace, Safety Brace Data Sheet, Reiker Enterprises, Inc., Anniston, Alabama.
Heavy Duty Slide Support System, Reiker Enterprises, Inc., Anniston, Alabama.
Fan Brace Catalog, Fan Brace, Inc., Bryan, Texas.

*Primary Examiner*—Anita King
*Assistant Examiner*—Amy J. Sterling
(74) *Attorney, Agent, or Firm*—Hoffman & Baron, LLP (57) ABSTRACT

A hanger bar assembly for supporting an outlet box between spaced apart support elements including a first channel member being longitudinally slidingly engagable with a second channel member forming a longitudinally adjustable support bar. The first channel member has a plurality of longitudinally extending grooves and the second channel member having a plurality of longitudinally extending rails slidingly received in the grooves such that lateral movement between the first and second channel members is resisted. A clamping device is provided for urging the first and second channel members into respective forced engagement thereby restricting movement between the first and second channel members. A securement device attached to the support bar for securing the support bar to the spaced support elements is further provided. The first and second channel members have apertures formed therein to accommodate fasteners for securing end plates to the support.

23 Claims, 4 Drawing Sheets

U.S. PATENT DOCUMENTS

| | | | | |
|---|---|---|---|---|
| 4,463,923 | A | 8/1984 | Reiker | |
| 4,513,994 | A | 4/1985 | Dover et al. | |
| 4,518,141 | A | 5/1985 | Parkin | |
| 4,538,786 | A | 9/1985 | Manning | |
| 4,564,165 | A * | 1/1986 | Grant et al. | 248/317 |
| 4,659,051 | A * | 4/1987 | Propp et al. | 248/546 |
| 4,682,452 | A | 7/1987 | Propp et al. | |
| 4,684,092 | A | 8/1987 | Reiker | |
| RE33,147 | E | 1/1990 | Reiker | |
| 4,909,405 | A | 3/1990 | Kerr, Jr. | |
| 4,995,582 | A | 2/1991 | Ligon, Jr. | |
| 5,024,412 | A | 6/1991 | Hung et al. | |
| 5,044,582 | A * | 9/1991 | Walters | 248/200.1 |
| 5,074,515 | A | 12/1991 | Carter, Jr. | |
| 5,150,868 | A * | 9/1992 | Kaden | 248/200.1 |
| 5,219,230 | A * | 6/1993 | Babbs | 248/430 |
| 5,301,914 | A * | 4/1994 | Yoshida et al. | 248/430 |
| 5,303,894 | A * | 4/1994 | Deschamps et al. | 248/343 |
| 5,386,959 | A * | 2/1995 | Laughlin et al. | 248/200.1 |
| 5,392,934 | A * | 2/1995 | Fox | 211/94.01 |
| 5,393,026 | A | 2/1995 | Deschamps et al. | |
| 5,435,514 | A * | 7/1995 | Kerr, Jr. | 248/205.1 |
| 5,678,799 | A | 10/1997 | Jorgensen et al. | |
| 5,741,000 | A * | 4/1998 | Goodbred | 248/424 |
| D395,816 | S * | 7/1998 | Colodny | D8/356 |
| 5,803,653 | A * | 9/1998 | Zuffetti | 403/363 |
| 5,934,631 | A | 8/1999 | Becker et al. | |
| 5,938,157 | A * | 8/1999 | Reiker | 156/71 |
| 5,954,304 | A | 9/1999 | Jorgensen | |
| 6,076,788 | A | 6/2000 | Akiyama | |
| 6,105,918 | A | 8/2000 | Gromotka | |
| 6,152,312 | A * | 11/2000 | Nava et al. | 211/94.01 |
| 6,237,884 | B1 * | 5/2001 | Howe | 248/200.1 |

\* cited by examiner

HANGER BAR ASSEMBLY

FIELD OF INVENTION

The present invention relates generally to a hanger bar assembly for supporting electrical fixtures. More particularly, the present invention relates to a hanger bar assembly having channel members that are slidably engagable, wherein longitudinal relative motion of the channel members is restricted upon securement of an electrical outlet box to the channel members.

BACKGROUND OF THE INVENTION

In order to secure electrical fixtures such as lights and fans in ceilings, a hanger bar device is typically employed. It is very important that a fixture be adequately supported in the ceiling since improper support could lead to the fixture breaking away from the ceiling. Ceilings are typically constructed of structural members including a series of spaced joists which are covered by lathe and plaster or a gypsum wallboard often referred to as drywall. The ceiling covering material or sheathing is not designed to support loads perpendicular to its surfaces. Therefore, in order to suspend electrical fixtures from a ceiling, the fixture's weight must be supported by the joists. To achieve this, a fixture may be secured directly to a joist, however, this limits the range of locations where the fixture may be placed. Such a limitation is problematic since it is often desirable to place the fixture in a specific position on the ceiling. Therefore, if no joist is adjacently positioned to the desired location, direct joist connection is not possible. A preferred solution for supporting electrical fixtures in the ceiling is the use of a hanger bar assembly. The hanger bar allows for the joists to be used for supporting an electrical fixture while still providing flexibility in positioning.

Hanger bar assemblies are typically extensible members that are disposed in between the ceiling joists and are securable thereto. An assembly's length, therefore, is adjustable to accommodate various joist spacing distances. Electrical outlet boxes, junction boxes and the like are then secured to the transverse members of the assembly. Such electrical boxes provide a termination point for electrical wiring as well as an attachment point for the electrical fixture. Typically the outlet box can be positioned at various points along the length of the members in order to properly position the fixture attached thereto. In conventional construction a cut out is made in the ceiling covering material in order to provide clearance for the electrical outlet box, thereby allowing the fixture to be secured to the outlet box.

The outlet box once secured to the hanger bar assembly is typically used to support the electrical fixture. The National Electric Code sets a maximum weight that an outlet box may support. Outlet boxes may either support lighting fixtures weighing up to 50 lbs. or ceiling fans weighing up to 35 lbs. Fixtures exceeding these weight limits must be supported independently of the box such as directly to the joists or other structural member.

Hanger bar assemblies can be divided into two general categories, standard and heavy duty and are distinguishable by the amount of weight they can safely support. Standard hanger bars are typically used to support lightweight lighting fixtures that are generally less than five pounds.

U.S. Pat. No. 2,925,236 to Cook et al. discloses a standard duty hanger bar assembly. The assembly includes telescopically engagable slotted channel members positionable between two ceiling joists. A box carrier is inserted in the channel members and has guide prongs extending from the slots. An outlet box is insertable over the prongs and is secured to the assembly by a box fastener which is securable to the box carrier by a threaded bolt. Upon the tightening of the bolt, a portion of the outlet box and a portion of the channel members are clamped together between the box carrier and fastener, thereby securing the box to the assembly. The box carrier, however, only engages a small amount of channel section thereby providing a relatively small clamping area. Accordingly, this assembly is suited for light duty applications such as small to medium sized light fixtures, which present static loadings.

Heavy duty hanger bars are typically employed for supporting heavy lighting fixtures up to 50 lbs. and ceiling fans weighing 35 lbs. Ceiling fans require high load bearing supports not only due to their weight but also due to the torque and vibrational forces that are generate by the rotation of the motor and fan blades. Relatively small weight differences between the blades of a ceiling fan can produce rotational imbalances leading to large vibrational forces. Therefore, a heavy duty hanger bar is required when suspending electrical fixtures such as ceiling fans.

Heavy duty hanger bars assemblies must be able to maintain their rigidity and length under high load situations. A load acting perpendicular to the length of the telescopic members tends to deflect the assembly toward the direction of the load. The degree of deflection increases when the members are free to move relative to each other as the members tend to be pulled apart by the load. Under certain circumstances, the deflection could be to such a degree that the members could be pulled completely apart resulting in the release of the outlet box and fixture attached thereto. Therefore, it is important that once the assembly is installed the members be secured so that they resist motion between themselves.

Heavy duty hanger bars may be designed for installation in new work or old work applications. New work applications include installations where the ceiling covering material has not yet been installed and access to the joists is available. This may occur in situations such as new construction or renovations where the ceiling material has been removed. Old work applications include installations where the ceiling covering material is already installed and the hanger bar needs to be inserted into an outlet box clearance opening cut into the ceiling. In such applications access to the joists is typically extremely limited. This situation is typically found when a ceiling fan is to be installed in a location where a ceiling lighting fixture had previously been installed.

A hanger bar assembly capable of supporting loads such as ceiling fans and adapted for use in new work applications has been disclosed in the Heavy Duty Slide Support System by Reiker Enterprises Inc, U.S. Pat. No. 5,938,157. This device includes telescopically engaged slotted channel members. The channels have a bottom wall formed by inwardly turned flanges defining a slot. Disposed within the channel members is a substantially planar plate having downwardly curved edges. The plate has two threaded bolts extending downwardly through the aligned slots. The threaded bolts extend through clearance holes in an outlet box and provide points on which to secure a fixture. A third threaded bolt extends from the center of the plate and is used to secure the box to the plate. The flanges of both channels extend downwardly at a slight angle. When the outlet box is secured to the channel members the flanges are forced together thereby clamping the two channel members together. The flanges, however, are relatively short thereby creating only a small amount of contact area between the flanges. Such limited amount of contact or clamping area limits the assembly's ability to resist slippage.

The Reiker Heavy Duty Slide Support System further includes a pair of end plates extending from the opposed ends of the assembly. The end plates are formed from upwardly bent extensions of the top wall of the channels. The end plates, therefore, are connected to the channels by a relatively thin strip of material. This design limits the assembly's ability to resist vibrational forces acting perpendicular to the channels. Such forces tend to cause the channel members to flex about the connection strip. This problem is exasperated by locating the connection strip above the assembly is neutral axis passing through the longitudinal centroid of the channel members. The offset between the connection strip and the neural axis creates a moment about the thin strip of connecting material and further reduces the assembly's ability to resist vibrational forces.

U.S. Pat. No. 5,934,631 to Becker et al. further discloses a telescoping hanger bar assembly that is capable of supporting relatively heavy loads such as ceiling fans. The channel members each have a different profile to allow one to slide freely within the other. A plate is supported within the channel members and is attachable to an outlet box, which is rated to support ceiling fans. One such outlet box is described in U.S. Pat. No. 5,824,952. Attachment of the box to the plate results in a clamping force which urges overlying flanges of the channel members into engagement.

The telescoping members of the prior art hanger bars are typically channels formed having different cross-section so that one member is received in the other member. In order to achieve rigidity between the members, it is important to obtain a close fit between the two members. However, the fit must permit the members to freely slide so the length of the hanger bar can be easily adjusted to accommodate securement between the joists. This is very difficult to consistently achieve especially when the members are extruded. Extruded profiles will vary from run to run based on the thermal expansion of the die. Since the channel members must always slidingly fit together, the members are necessary toleranced to permit a certain amount of play between the members. This play between members, however, reduced the rigidity of the assembly and limits its load bearing and vibration resistance capability.

Accordingly, it would be desirable to devise a hanger bar assembly capable of supporting heavy loads such as ceiling fans that can be quickly installed and relatively simple to produce as well as being sufficiently rigid to resist vibrational forces under the heavy load of a fixture.

SUMMARY OF THE INVENTION

It is an advantage of the present invention to provide a hanger bar assembly for rigidly supporting an outlet box between spaced apart support elements.

It is a further advantage of the present invention to provide a hanger bar assembly including a pair of interlocking engageable channel members which may be adjusted to an operating length and clamped to prevent relative channel member movement.

It is still a further advantage of the present invention to provide a hanger bar assembly including a joist engaging device which provides an installer with positive notice of proper engagement.

In the efficient attainment of these and other objects the present invention provides a hanger bar assembly for supporting an outlet box between spaced apart support elements including a first channel member being longitudinally slidingly engagable with a second channel member forming a longitudinally adjustable support bar. A first channel member includes a plurality of longitudinally extending first grooves and a plurality of longitudinally extending first rails is provided. The second channel member includes a plurality of longitudinally extending second rails and a plurality of longitudinally extending second grooves. The first rails are slidingly received in said second grooves and the second rails being slidingly received in the first grooves such that lateral movement between the first and second channel members is resisted. A clamping device for urging the flanges into force engagement with the transverse extent of a corresponding channel member is also provided, thereby restricting movement between the first and second channel members. Additionally, a securement device is provided for securing the support bar to the spaced support elements.

In a preferred embodiment the first and second channel members include apertures formed therein to receive fastening hardware to secure said end plates to the support. Both channel members may include a plurality of cooperating grooves and rails formed therein which provide rigidity to the hanger bar assembly. The channel members preferable have substantially the same cross-sectional profile. In the preferred embodiment, the channel members may be extruded with the various features including the apertures, grooves and rails formed during the extrusion process.

The present invention also provides a hanger bar assembly for supporting an outlet box between spaced apart support elements including a first channel member being longitudinally slidingly engagable with a second channel member forming an longitudinally adjustable support bar. The first and second channel members upon mutual engagement form a plurality of laterally spaced interlocking rail and groove combinations to resist lateral and rotational movement between the first and second channel members. The assembly further includes a clamping device for urging the first and second channel members into respective forced engagement thereby restricting movement between the first and second channel members. A securement device attached to the support bar is provided for securing the support bar to the spaced support elements.

The present invention also provides a hanger bar assembly for supporting an outlet box between spaced apart support elements including a first channel member being longitudinally slidingly engagable with a second channel member. Each of the first and second channel members include a pair of side walls spaced by a connecting wall to form a channel interior. The first channel members has a plurality of longitudinally extending shims projecting therefrom and being engagable with opposed surfaces of the second channel member. The shims effect a fit between the first and second channel members. A clamp for urging the first and second channel members into respective forced engagement thereby restricting movement between the first and second channel members. A securement device attached to the first and second channel members for securing the hanger bar assembly to the spaced support elements is further provided.

A preferred form of the hanger bar assembly, as well as other embodiments, advantages, and features of this invention will be apparent from the following detailed description of illustrative embodiments thereof, which is to be read in connection with the accompanying drawings.

DETAILED DESCRIPTION OF THE PREFERRED EMBODIMENT

The hanger bar assembly of the present invention is adapted to support relatively heavy electrical fixtures such as ceiling fans in "new work" applications where the ceiling covering material such as plaster or drywall has yet to be installed and where the joists are substantially exposed. Ceiling fans, in addition to being relatively heavy, typically create cyclic loadings and vibrational forces due to the rotation of the motor and fan blades. Such forces must be adequately supported in order to ensure the fixture does not separate from the ceiling support structures to which it is attached. The hanger bar assembly of the present invention provides support for such fixtures as ceiling fans by maintaining its rigidity in configuration even under relatively high loadings.

Figure 1:
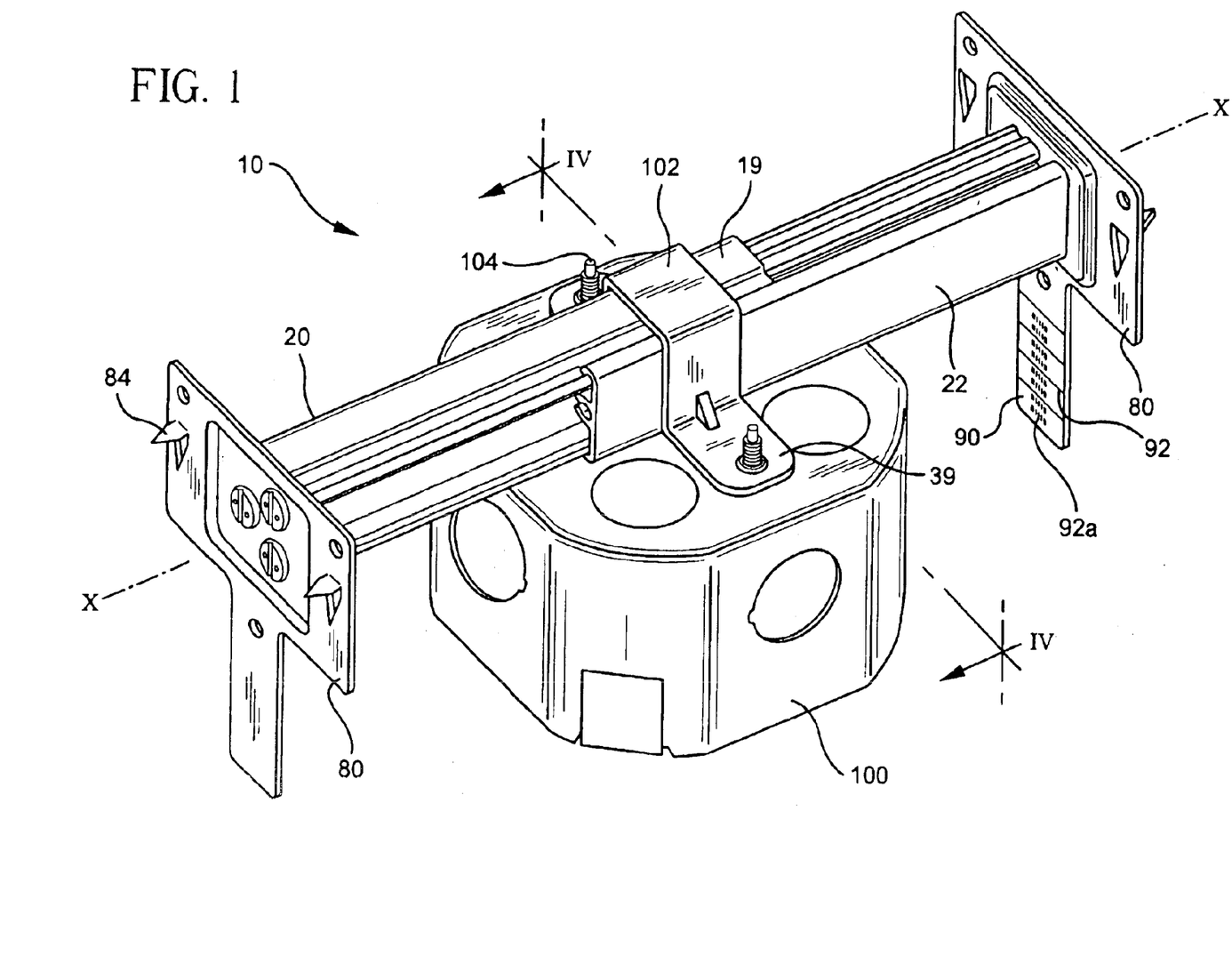
FIG. 1 is a perspective view of the hanger bar assembly of the present invention with an outlet box secured thereto.

Referring to FIG. 1, the hanger bar assembly 10 formed in accordance with the preferred embodiment of the present invention is shown. Hanger bar assembly 10 includes a pair of channel members 20 and 22 and stud engaging members. Hanger bar assembly 10 is positionable between spaced apart support elements, such as ceiling joists (not shown), and securely engageable therewith. An outlet box, junction box or the like 100 may be secured to the hanger bar assembly 10 by a bracket, in a manner which will be described in detail below. Outlet box 100 may be chosen from a variety of heavy duty boxes such as that disclosed in U.S. Pat. No. 5,824,952. Once the outlet box is secured, an electrical fixture (not shown), such as a ceiling fan, may then be secure to the outlet box in a manner well known in the art. Hanger bar assembly 10 and the joists provide the necessary support for the fixture.

Figure 2:
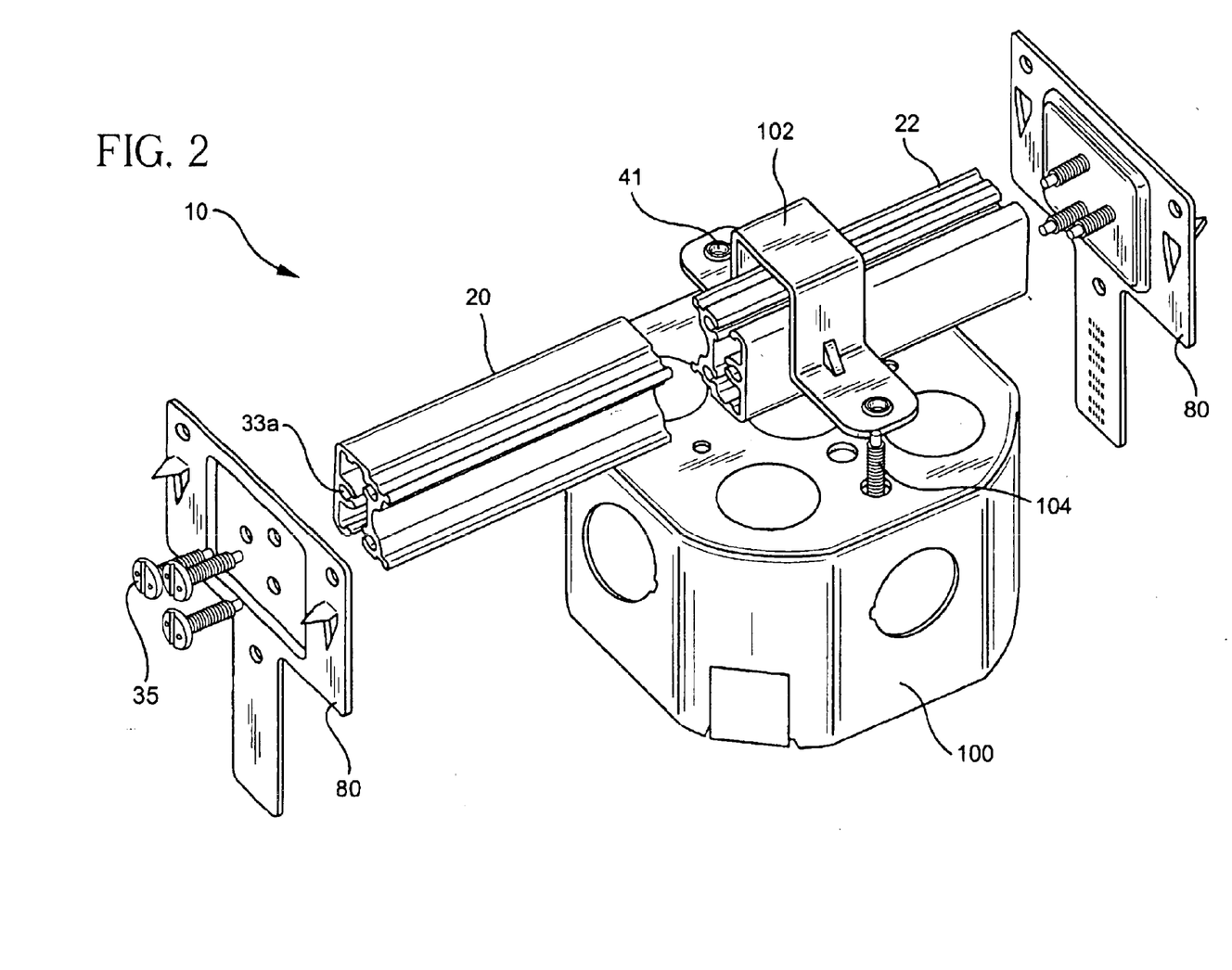
FIG. 2 is an exploded perspective view of the hanger bar assembly of FIG. 1.
Figure 3:
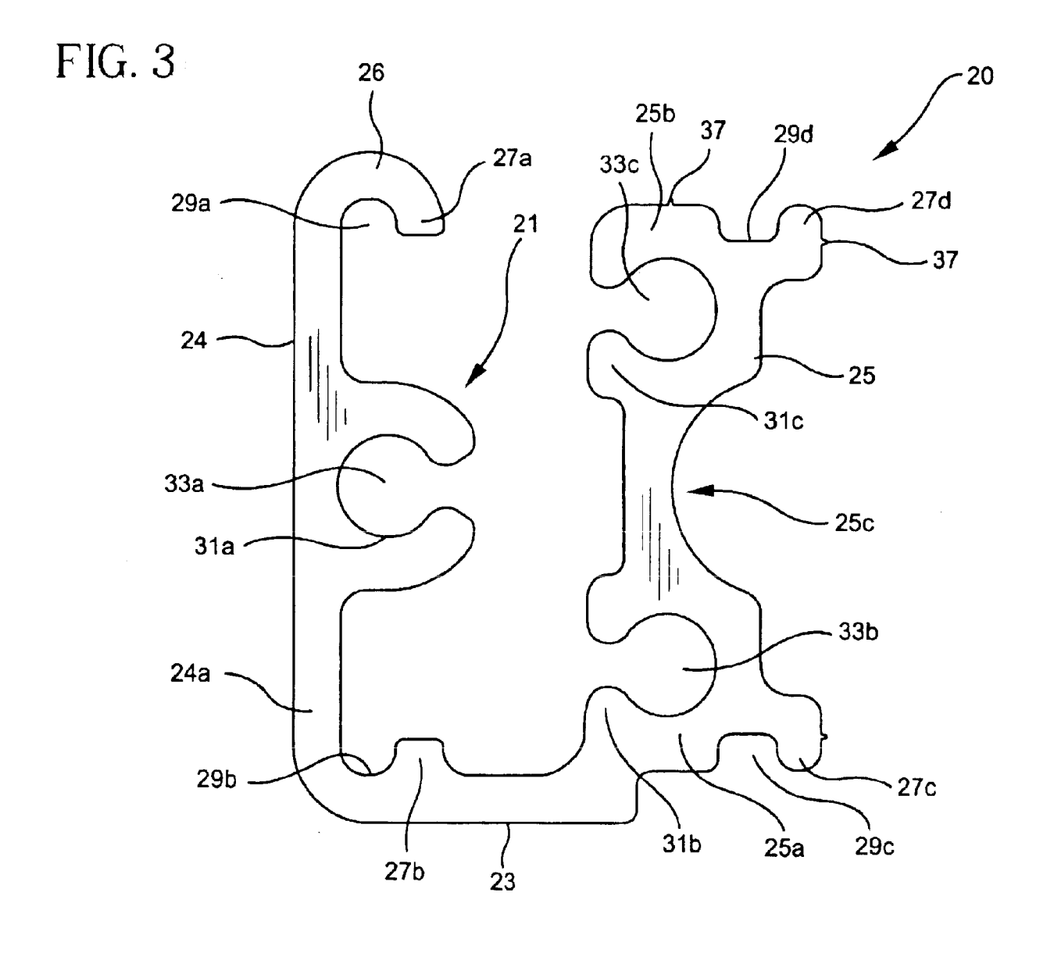
FIG. 3 is an elevational end view of a channel member of the present invention.

Referring additionally into FIGS. 2 and 3, channel members 20 and 22 are elongate members that are longitudinally slidably engageable with one another to form a longitudinally adjustable support bar 19. Each channel member 20 and 22 is freely slidable with respect to the other, thereby permitting the length of hanger bar assembly 10 to be easily adjusted and inserted between joists or other support elements. Channel members 20 and 22 are interlocking members preferably having substantially identical cross-sectional profiles. Accordingly, the manufacturing of the hanger bar assembly is simplified and improved efficiency is obtained since only one part need be produced and cut into finishing lengths to form the two channel members. In the preferred embodiment, channel members 20 and 22 are formed from extruded aluminum material which is simply cut to the desired length.

In the preferred embodiment, each channel member 20 and 22 has the same cross-sectional profile and is similarly formed as the other, therefore, only the first channel member 20 will be described in detail. (Reference numerals for second channel member 22 will correspond to those used for first channel member 20 with the exception of having an additional "'".) Referring to FIG. 3, channel member 20 in profile includes a variety of indentations and protrusions extending along its length which correspond with complimentary structures on second channel member 22 when the two channel members are assembled together. The cooperation of such profile features contributes to the assembly's rigidity and strength. Channel member 20 has a generally U-shaped cross-section including a first and second space side walls 24 and 25 extending from a connecting wall 23. First side wall 24 ends in an inturned portion 26 extending along the length of channel member 20 forming a first rail-like member 27a. Also formed by inturned portion 26 is a first groove 29a. Intermediately disposed between inturned portion 26 and connecting wall 23 is a C-shaped member 31a protruding into a channel interior 21 and defining a first securement opening 33a. A second and third C-shaped member 31b and 31c are formed on second side wall 25 and open toward channel interior 21 to form second and third securement openings 33b and 33c. Securement openings 33a–c are sized to receive fastening devices 35 used to secure end plates 80 (FIG. 1) to channel member 20. In the preferred embodiment, fastening devices 35 include self-tapping screws which form the threads in the channel member as they are driven therein. Therefore, no additional machining of the channel members or complicated fastening system is required. In an alternative embodiment, C-shaped members could also be completely circular or have other shapes to form a securement opening.

Connecting wall 23 includes a protrusion forming a second rail 27b and a second groove 29b defined by second rail 27b and a lower portion 24a of first side wall 24.

Second side wall 25 includes a step portion 25a extending generally laterally from connecting wall 23. A third longitudinally extending groove 29c is formed in the step portion. Laterally exterior to third groove 29c is a protrusion forming a third rail 27c. A fourth groove 29d and fourth rail 27d are formed on a free end 25b of second side wall 25. Second side wall 25 further includes an outwardly facing concave shaped slot 25c generally centrally disposed in second side wall 25. The various integrally formed protrusions on side wall 24 and 25 and connecting wall 23, create a rigid structure that resists bending.

Figure 4:
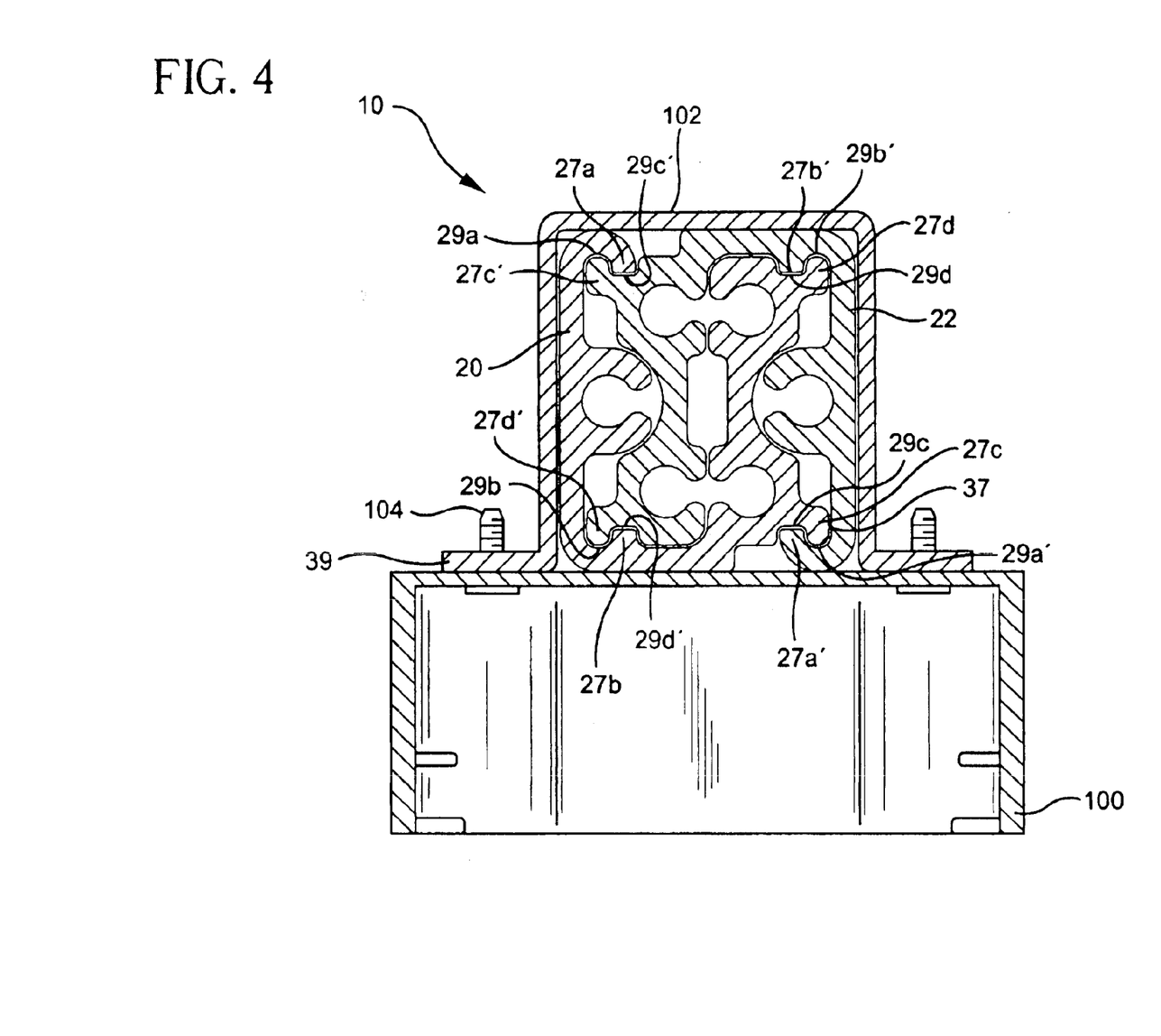
FIG. 4 is a cross-sectional view of the assembly taken along line IV—IV of FIG. 1.

Referring specifically to FIG. 4, channel members 20 and 22 may be interlocked with each other by aligning the channel members end to end with one channel inverted with respect to the other. The channel members may then be moved together such that a portion of each channel member slides within the other. Channel members 20 and 22 are so configured such that when they are interlocked a significant portion of each channel engages the other channel. Additionally, first and second channel members 20 and 22 upon mutual engagement form a plurality of laterally spaced interlocking rail and groove combinations to resist lateral and rotational movement between first and second channel members. Specifically, channel member 20 first rail 27a and first groove 29a cooperate with channel member 22 third groove 29c' and third rail 27c', respectively. Channel member 20 second groove 29b and second rail 27b cooperate with channel member 22 fourth rail 27d' and fourth groove 29d', respectively. Channel member 20 third groove 29c and third rail 29c cooperate with channel member 22 first rail 27a' and first groove 29a', respectively. In addition, channel member 20 fourth groove 29d and fourth rail 27d cooperate with channel member 22 second rail 27b' and second groove 29b', respectively. Accordingly, each corner of the assembled channel members has cooperating and interlocking grooves and rails. These interlocking rail and groove combinations prevent lateral separation of the channel members, i.e., separation along any axis perpendicular to a longitudinal axis X—X (FIG. 1), while permitting longitudinal adjustment. Relative rotation along the longitudinal axis X—X is also prevented. Therefore, once the channel members are slid together they can only be disengaged from one another by sliding them apart.

By employing channel members that are formed from the same profile, closer tolerances can be used since the two channel members are made at the same time in the same forming apparatus such as a die. After a piece of stock is run through the die, it will be cut to the desired length and the resulting pieces assembled as pairs. Any dimensional variation caused by the forming process will be reflected in each piece, thereby canceling out the variations. Accordingly, manufacturing tolerances can be tightened resulting in a more rigid assembly. The present invention eliminates the problems associated by using channel members have different cross-sectional profiles which are formed on different dies or forming stations. In such assemblies, wider tolerances are needed to ensure that the engaged members will freely slide. This creates play between the members, which detracts from the rigidity of the assembly.

In order to further ensure a play-free engagement between first and second channel members, 20 and 22, the present invention further includes longitudinally extending shims 37 protruding from second side wall 25. Shims 37 preferably include relatively thin, ridge-like projections that engage opposing surfaces when the two channel members are assembled. If the fit is too tight and the channel members are difficult to assembly or slide, shims 37 may be easily abraded off. This is especially true when the channel material is aluminum due the materials ease of workability.

The use of shims 37 also permits for tooling used to form channel members 20 and 22 to be economically produced. For extruded material dies are produced that give shape to the channel members. These dies have a significant cost associated with their development. If the material extruded through the dies does not permit the proper clearance resulting in either too much play or too much sliding resistances, either new dies would have to be made or expensive modifications would be made to the existing dies. However, by employing shims 37 if the fit between channel members 20 and 22 needs to be adjusted, the profile in the die corresponding to a shim may be economically either filed or deepened which would result in a smaller or larger shim.

The resistance to undesired motion between channel members offered by the present invention permits the assembly 10 to safely carry a significant load. When an electrical fixture is secured to hanger bar assembly 10, the resultant load acting downwardly thereon tends to bow the assembly pulling the channel members apart. If the channel members, once installed, were permitted to move relative to each other, this tendency to bow would not be restricted, and the resultant sagging, would present an opportunity for the channel members to slip apart and release the outlet box. If this were to occur, the fixture could come loose from the ceiling leading to a potentially hazardous situation due to the weight of the fixture. However, by restricting relative movement between the channel members, the rigidity of the hanger bar assembly is increased, and its tendency to bow downwardly is greatly reduced. Additionally, in ceiling fan applications, the hanger bar assembly 10 experiences torque and vibrational forces as well as static vertical loadings. A hanger bar assembly's resistance to these dynamic forces is also augmented when the rigidity of the assembly is increased. In the present invention, the requisite rigidity is obtained by preventing relative movement between channel members 20 and 22 by way of a close fit and by clamping the channel members together as described in detail below.

Referring to FIGS. 1 and 4, in order to prevent channel members 20 and 22 from sliding apart, the channel members are preferably urged into forced engagement when outlet box 100 is secured to hanger bar assembly 10. Outlet box 100 is secured to hanger bar assembly 10 by bracket 102 that is placed over hanger bar assembly 10 at a location where it straddles both channel members 20 and 22. Bracket 102 is generally U-shaped and has outwardly extending flanges 103 including fastener receiving apertures 41. Fasteners 104 may extend past through-holes in the back wall of outlet box 100 and threadedly engage the flange apertures 41. Box 100 and bracket 102 essentially form a clamping device whereby upon advancing fasteners 104 provides the clamping force which urges channel members 20 and 22 together to restrict all degrees of movement between the channel members. As a result of the interlocking configuration created by the rails and grooves, a substantial area of interference is created between channel members 20 and 22. The clamping force generated upon securement of outlet box 100, therefore, acts over a significant area providing hanger bar assembly 10 with the ability to resist slippage between channel members 20 and 22 even under the high loads and vibrations generated by fixtures such as ceiling fans.

The strength of the clamping force combined with the rigid profile and interlocking elements, the hanger bar assembly is able to withstand static and dynamic loads well beyond those required by the applicable codes. Accordingly, relatively heavy fixtures including ceiling fans and ornate fixtures may be safely secured to a structure such as ceiling joists.

Referring additionally to FIG. 2, hanger bar assembly 10 further includes a pair of similarly formed end plates 80 attached at each end to permit the hanger bar assembly 10 to be secured to a structure. As set forth above, end plates 80 are preferably secured to the channel members 20 and 22 by fastening hardware extending through end plates 80 into securement openings 33a–c formed in channel members 20 and 30. End plates are secured to the channel members at multiple points above and below the longitudinal centerline of the engaged channel members. Therefore, the connection resists bending moments caused by any forced acting perpendicular to the longitudinal axis. Each end plate 80 has a generally planar upper portion 81 and a leg 90 depending downwardly therefrom. The upper portion 81 of each end plate includes mounting holes 82 through which fastening hardware such as nails or screws (not shown) may be inserted into the joist thereby securing hanger assembly 10 to the joists. Screws are preferably used in order to provide the desired securement of the assembly.

Each end plate 80 preferably further includes a pair of spurs 84 that are used to temporarily hold the assembly to the joists until the fastening hardware is installed. Spurs 84 are preferably formed from a stamped out portion of the end plate itself and are shaped to form a V-shaped member as shown in FIG. 1. When an installer strikes end plate 80 with a hammer, spurs 84 are driven into the joist. After the spurs of both end plates are driven into the joists, the assembly does not need to be supported by the installer. Therefore, the installer will have both hands free to install the permanent fastening hardware, which facilitates speedy permanent installation.

In order to further increase the ease of installation, downwardly depending leg 90 may includes various score lines 92 along its length. Score lines 92 act as guides for locating assembly 10 with respect to the joists. It is important to properly locate the assembly since after an outlet box is secured to hanger bar assembly 10 the face of outlet box 100 must be generally flush with the front face of the ceiling covering material. The proper location of the assembly with respect to the joists is a function of outlet box depth and the ceiling covering material used. The deeper the box the higher the assembly must be secured on the joists. In addition, a plaster ceiling requires the assembly to be located lower than for a drywall ceiling. Score lines 92, therefore, are labeled 92a with the box type and ceiling material. Proper location is achieved when the score line 92 on each end plate 80 indicating the specifics of the application is aligned with the bottom of the joist. Therefore, it is preferable that the labeling 92a of the score lines be located on the side of the end plate attached to the channel member so that an installer is able to see the markings when holding the assembly up to the joists. Additionally, score lines 92 are of such a depth that leg 90 may be easily deformed or fractured along a particular score line by the installer as required.

Although the illustrative embodiments of the present invention have been described herein with reference to the accompanied drawings, it is to be understood that the invention is not limited to those precise embodiments and that various other changes and modifications may be effected therein by one skilled in the art without departing from the scope or spirit of the invention.

What is claimed is:

1. A hanger bar assembly for supporting an outlet box between spaced apart support elements comprising:
    a first channel member being longitudinally slidingly engagable with a second channel member forming a longitudinally adjustable support bar, said first and second channels each having a channel interior, and a portion of the first channel extends into the second channel interior and a portion of the second channel extends into the first channel interior when the first and second channels are engaged, said first and said second channel members have a generally U-shaped cross-sectional profile, and said second channel member is inverted with respect to the first channel member,
    said first channel member having a plurality of longitudinally extending first grooves and a plurality of longitudinally extending first rails, said second channel member having a plurality of longitudinally extending second rails and a plurality of longitudinally extending second grooves, the first rails being slidingly received in said second grooves and said second rails being slidingly received in said first grooves such that rotational movement between said first and second channel members is resisted;
    a clamping device for urging said fist and second channel members into respective forced engagement thereby restricting movement between said first and second channel members; and
    a securement device attached to said support bar for securing said support bar to the spaced support elements.

2. The hanger bar assembly as defined in claim 1, wherein the securement device includes a pair of end plates secured to ends of said support bar.

3. The hanger bar assembly as defined in claim 2, wherein said first and second channel members include apertures formed therein to receive fastening hardware to secure said end plates to said support bar.

4. A hanger bar assembly as defined in claim 2, wherein said pair of end plates each include at least one spike member extending outwardly for engagement with the support elements, and said at least one spike member includes an elongate portion having a substantially uniform cross-section terminating in a tapered endpoint.

5. The hanger bar assembly as defined in claim 1, wherein said first and second channel members have substantially similar cross-sectional profiles.

6. The hanger bar assembly as defined in claim 1, wherein said clamp includes a bracket slidingly positionable over said support bar and engagable with the outlet box, said clamping device further including a fastener securable with said bracket such that upon securing said fastener to said bracket said first and second channel members are clamped together between said bracket and the outlet box.

7. The hanger bar assembly as defined in claim 1, wherein said first and second channel members include a plurality of longitudinally extending shims extending therefrom.

8. The hanger bar assembly as defined in claim 1, wherein said first and second channel members are formed of an extruded material.

9. A hanger bar assembly for supporting an outlet box between spaced apart support elements comprising:
    a first channel member and a second channel member each having a plurality of apertures integrally formed therein adapted to receive fasteners, said first channel member being longitudinally slidingly engagable with said second channel member forming an longitudinally adjustable support bar, said first and said second channel members having the same cross-sectional profile;
    a clamp for urging said first and second channel members into respective forced engagement thereby restricting movement between said first and second channel members; and
    a pair of end plates attached to opposed ends of said support bar by a plurality of fasteners extending into said plurality of apertures, said pair of endplates adapted to secure said support bar to the spaced support elements.

10. The hanger bar assembly as defined in claim 9, wherein said first channel member includes a first and second spaced side walls extending from a connecting wall to define a channel, said first side wall including one of said plurality of apertures formed therein.

11. The hanger bar assembly as defined in claim 9, wherein said first channel member second side wall includes a second and a third of said plurality of apertures formed therein.

12. The hanger bar assembly as defined in claim 9, wherein said first and second channel members have substantially similar cross-sectional profiles.

13. The hanger bar assembly as defined in claim 9, wherein said first and second channel members upon engagement form a plurality of laterally spaced interlocking rail and groove combinations that prevent lateral separation of said first channel member from said second channel member.

14. A hanger bar assembly for supporting an outlet box between spaced apart support elements comprising:
    a first channel member being longitudinally slidingly engagable with a second channel member forming an longitudinally adjustable support bar, said first and second channel members upon mutual engagement form a plurality of laterally spaced interlocking rail and groove combinations that resist lateral separation of said first and second channel members, said first and second channel members having the same cross-sectional profile;
    a clamp for urging said first and second channel members into respective forced engagement thereby restricting longitudinal movement between said first and second channel members; and a securement device attached to said support bar for securing said support bar to said spaced support elements.

15. A hanger bar assembly for supporting an outlet box between spaced apart support elements comprising:
   a first channel member being longitudinally slidingly engagable with a second channel member, each of said first and second channel members including a pair of side walls spaced by a connecting wall to form a channel interior,
   said first channel members having a plurality of longitudinally extending shims projecting therefrom and being engagable with opposed surfaces of said second channel member, said shims effecting a fit between said first and second channel members;
   a clamp for urging said first and second channel members into respective forced engagement thereby restricting movement between said first and second channel members; and
   a securement device attached to said first and second channel members for securing the hanger bar assembly to the spaced support elements.

16. The hanger bar as defined in claim 15, wherein said first and second channel members upon mutual engagement form a plurality of laterally spaced interlocking rail and groove combinations that resist lateral separation of said first and second channel members, and said shims being formed on said rails of said first channel member.

17. The hanger bar assembly as defined in claim 16, wherein said second channel member includes a plurality of shims formed thereon, said second channel member shims being engagable with opposed surfaces of said first channel member.

18. The hanger bar assembly as defined in claim 15, wherein said first and second channel members include members having a uniform cross sectional profile.

19. A hanger bar assembly for supporting an outlet box between spaced apart support elements comprising:
   a first channel member being longitudinally slidingly engagable with a second channel member forming a longitudinally adjustable support bar, said first channel member having a plurality of longitudinally extending first grooves and a plurality of longitudinally extending first rails, said second channel member having a plurality of longitudinally extending second rails and a plurality of longitudinally extending second grooves, the first rails being slidingly received in said second grooves and said second rails being slidingly received in said first grooves such that rotational movement between said first and second channel members is resisted;
   said first and second channel members including a plurality of longitudinally extending shims extending therefrom;
   a clamping device for urging said first and second channel members into respective forced engagement thereby restricting movement between said first and second channel members; and
   a securement device attached to said support bar for securing said support bar to the spaced support elements.

20. A hanger bar assembly for supporting an outlet box between spaced apart support elements comprising:
   a first channel member being longitudinally slidingly engagable with a second channel member forming a longitudinally adjustable support bar, said first channel and said second channel having the same cross-sectional profiles, said first channel member having a plurality of longitudinally extending first grooves and a plurality of longitudinally extending first rails, said second channel member having a plurality of longitudinally extending second rails and a plurality of longitudinally extending second grooves, the first rails being slidingly received in said second grooves and said second rails being slidingly received in said first grooves such that rotational movement between said first and second channel members is resisted;
   a clamping device for urging said first and second channel members into respective forced engagement thereby restricting movement between said first and second channel members; and
   a securement device attached to said support bar for securing said support bar to the spaced support elements.

21. A hanger bar assembly as defined in claim 1, wherein said first and said second channel members have the same cross-sectional profiles.

22. A hanger bar assembly for supporting an outlet box between spaced apart support elements comprising:
   a first channel member being longitudinally slidingly engagable with a second channel member forming a longitudinally adjustable support bar, said first and second channels each having a channel interior, and a portion of the first channel extends into the second channel interior mild a portion of the second channel extends into the first channel interior when the first and second channels are engaged, said first and second channel members including a plurality of longitudinally extending shims extending therefrom,
   said first channel member having a plurality of longitudinally extending first grooves and a plurality of longitudinally extending first rails, said second channel member having a plurality of longitudinally extending second rails and a plurality of longitudinally extending second grooves, the first rails being slidingly received in said second grooves and said second rails being slidingly received in said first grooves such that rotational movement between said first and second channel members is resisted;
   a clamping device for urging said first and second channel members into respective forced engagement thereby restricting movement between said first and second channel members; and
   a securement device attached to said support bar for securing said support bar to the spaced support elements.

23. A hanger bar assembly for supporting an outlet box between spaced apart support elements comprising:
   a first channel member being longitudinally slidingly engagable with a second channel member forming a longitudinally adjustable support bar, said first and second channels each having a channel interior, and a portion of the first channel extends into the second channel interior and a portion of the second channel extends into the first channel interior when the first and second channels are engaged, said first and second channel members having the same cross-sectional profile;
   said first channel member having a plurality of longitudinally extending first grooves and a plurality of longitudinally extending first rails, said second channel member having a plurality of longitudinally extending second rails and a plurality of longitudinally extending second grooves, the first rails being slidingly received in said second grooves and said second rails being slidingly received in said first grooves such that rotational movement between said first and second channel members is resisted;

a clamping device for urging said first and second channel members into respective forced engagement thereby restricting movement between said first and second channel members; and a securement device attached to said support bar for securing said support bar to the spaced support elements.

* * * * *